No. 689,029. Patented Dec. 17, 1901.
A. SMITH.
APPARATUS FOR HANDLING GRANULAR MATERIAL.
(Application filed July 29, 1901.)
(No Model.) 3 Sheets—Sheet 2.
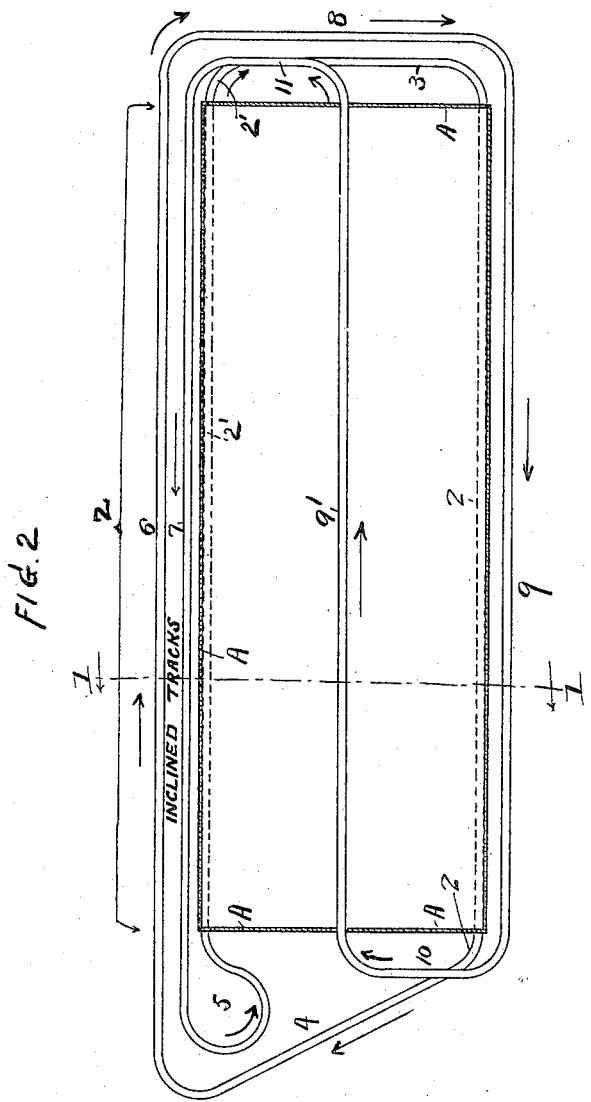
WITNESSES:
F. W. Wright
S. C. Coano
INVENTOR
AUGUSTUS SMITH
BY
Howson and Howson
HIS ATTORNEYS.

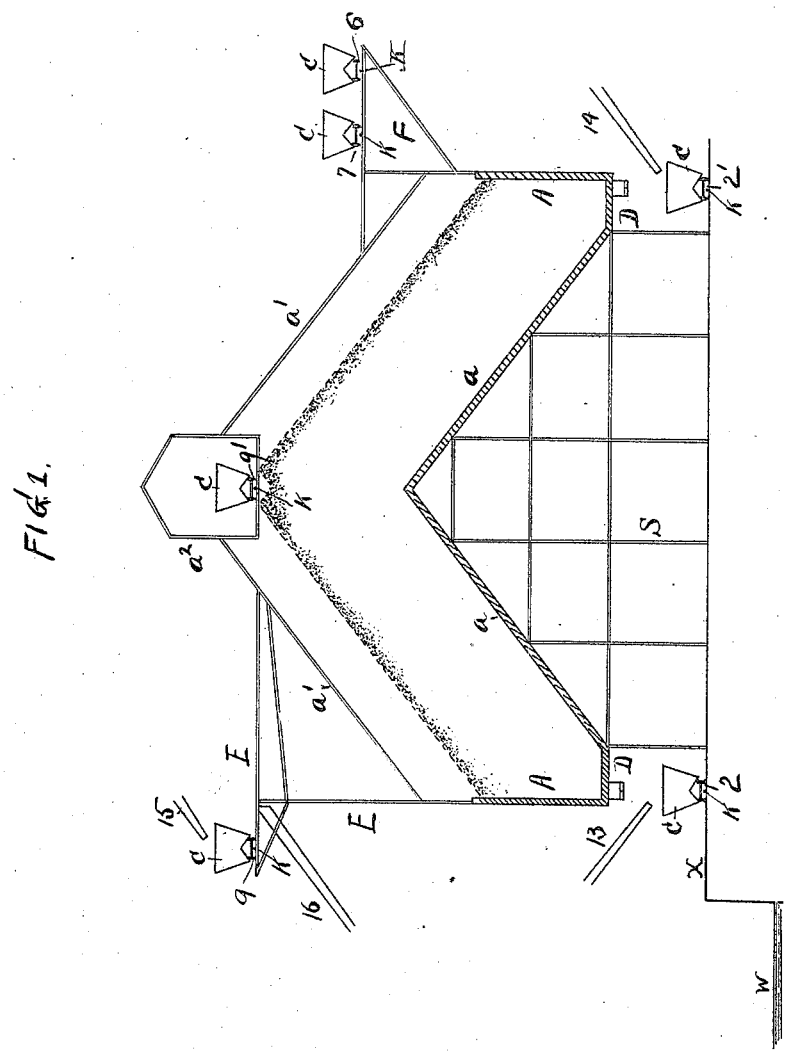

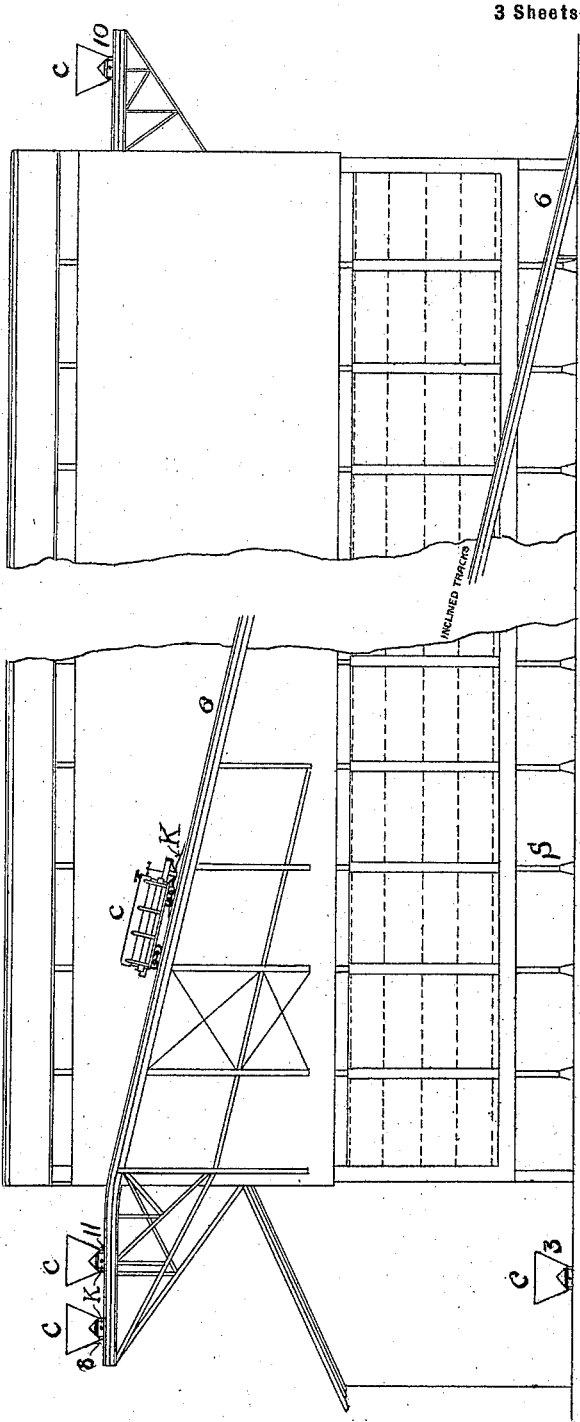

UNITED STATES PATENT OFFICE.

AUGUSTUS SMITH, OF NEW YORK, N. Y.

APPARATUS FOR HANDLING GRANULAR MATERIAL.

SPECIFICATION forming part of Letters Patent No. 689,029, dated December 17, 1901.

Application filed July 29, 1901. Serial No. 70,094. (No model.)

*To all whom it may concern:*

Be it known that I, AUGUSTUS SMITH, a citizen of the United States of America, residing in the borough of Manhattan, in the county of New York, State of New York, have invented Apparatus for Handling Coal and other Granular Material, of which the following is a specification.

My invention relates to the construction of a plant for the handling and storage of coal and other granular material; and the object of my invention is to simplify and improve the construction and operation of such a plant or apparatus.

In the accompanying drawings, Figure 1 is a transverse vertical section as if taken on the line 1 1, Fig. 2; and Fig. 2 is a diagrammatic plan view showing the arrangement of the endless convoluted track. Fig. 3 is a side elevation of the structure on the inclined-track side, a part being broken out in order to get the view within the compass of the sheet.

While my invention is applicable to the handling and storage of various kinds of granular material, it is particularly useful for the handling and storage of coal at a coaling-station.

A A indicate the four side walls of a rectangular storage structure which I prefer to provide with a floor $a\ a$, inclined downward from a longitudinal center line to both sides with discharge-gates along each side at D D, the whole being suitably mounted upon a structure S on the ground X. In the drawings I have indicated the plant as if located at a wharf, W representing water where floating vessels may be brought up to the edge of the wharf and alongside the building either to unload coal or other granular material into the building for storage or to be loaded with such material from the supply in the building. The building may, however, be arranged alongside of or between standard-gage railway-tracks or elsewhere convenient for loading and unloading by means of any suitable hoisting, elevating, or conveying appliances.

I prefer to cover the storage-house with a roof $a'\ a'$, inclined to be substantially parallel with the floors $a\ a$, whose inclines are at such an angle as that the granular material will flow down them. Immediately over the longitudinal center line of the building or, in other words, along the line of the ridge is a passage-way $a^2$ of sufficient cross-section for the passage therethrough of any suitable loading and unloading cars upon a track 9', supported on the structure of the building. Upon that side of the building on which the principal loading and unloading is to take place— the wharf side in the case illustrated—I provide at the upper part of the building a track 9 at such a height as may be convenient for loading vessels or cars or for unloading them into the building through the aid of any well-known hoisting or conveying means. I have shown this track 9 as mounted upon a structure E upon the building. A spout or chute of an elevating apparatus is indicated at 15 for the transfer of the coal or other granular material which has been hoisted by elevating appliances from vessels or cars alongside the building below, while at 16 I have indicated part of a chute by which granular material may be discharged from the cars C to vessels or railway-cars below. At the lower part of the building are two car-tracks 2 and 2', passing along under the discharge gates or hoppers D along the sides of the building. Upon opening these gates D the cars C on these tracks may be loaded with the granular material in the building, or these cars while on these same tracks may be loaded with material from outside the building, with the aid or not of elevating means, discharging into the cars through chutes 13 or 14, Fig. 1. The two upper tracks 9 and 9' and the two lower tracks 2 and 2' are connected together into one endless track in convolutions in the manner which will be better understood on reference to the diagrammatic plan view, Fig. 2. It will be there seen that the two tracks 2 and 2', running lengthwise of the building at its lower part, are connected together at one end of the building (the right hand in the view) by a return-bend 3, while the two upper tracks 9 and 9', also running longitudinally of the building, are connected together at the opposite end of the building by a return-bend 10. Thus the tracks 2, 2', and 3 constitute one loop at the lower part of the building, while the tracks 9, 9', and 10 constitute another loop above the storage part of the structure and over the lower loop, the open ends of the loop being at opposite ends of the building. I connect these two loops together into one endless convoluted track by means of two inclined tracks 6 and 7, running lengthwise of the building, preferably on the opposite side of the building from that on which the track 9 is situated. As shown in Fig. 1, these tracks 6 and 7 may be supported upon a suitable structure F, and they incline in the same direction side by side, the inclination extending, say, the length of the bracket Z in Fig. 2. At the bottom of these inclined tracks the track 6 is connected by a return-bend 4 to the leg 2 of the lower loop, while the track 7 is connected by a return-bend 5 to the other leg 2' of the lower loop. At the top of the inclined tracks the leg 9 of the upper loop is connected by a return-bend 8 to the track 6, while the leg 9' of the same upper loop is connected by a bend 11 to the track 7. Thus a cross-section taken through the building at any point in its length will apparently cut through six car-tracks—two below, 2 2', two above, 9 9', and the inclined connecting tracks 6 7 at the side. The direction of travel of the cars C on the endless track may be as indicated by the arrows in Fig. 2 or in the reverse, as may be found convenient.

While my invention is especially advantageous where a cable K, Fig. 1, is employed, (since it will require the use of but a single cable,) I do not wish to restrict myself to the employment of any special motive power. For example, compressed air, electricity, or other means may be used for traversing the cars.

Supposing that it is desired to load a vessel or car at W with coal or other granular material stored in the building, the cars C as they pass (say in the direction of the arrows, Fig. 2) over the tracks 2 and 2' are loaded at the gates D, Fig. 1, and they then pass by return-bend 4, Fig. 2, up the inclined track 6 and bend 8 to the elevated track 9, along which any well-known trip devices may be set to cause the loads to be discharged from the cars C and down a chute or chutes 16, Fig. 1, into the vessels. The empty cars pass on around the bend 10, Fig. 2, track 9', bend 11, and down the inclined track 7 and bend 5 to the lower track 2' to be reloaded. Supposing it be desired to transfer the coal from vessels or cars into storage in the building, the cars C may be loaded through chutes 13 and 14 while on the lower tracks 2 and 2', whence they pass, as before, by return-bend 4, Fig. 2, up the inclined way 6 to the upper bend 8, track 9, and bend 10 to the central trackway 9', Fig. 1, where suitably-set trips may be employed to cause the discharge of the material into storage over the floor $a\,a$, or, if found preferable, the cars C may be loaded by elevating apparatus and chute 15, Fig. 1, while on the track 9 and discharge into the house while traversing track 9'.

In the storage of bituminous coal it is important to limit the depth of coal in order to avoid spontaneous combustion, and it is for that reason I made the floor $a\,a$ inclined at about the natural angle which a coal-pile will assume, thus securing large storage capacity with a safe depth. It is also found necessary to turn the pile of coal over at intervals or stir it up in order to avoid combustion in layers of even moderate depth. My improved construction of apparatus is especially adapted to do this. For this purpose, the cable being set in motion, the cars C are loaded from the coal in storage as the cars pass along the tracks 2 2', Fig. 1, and thence they pass the bend 4, Fig. 2, up the incline 6, bend 8, track 9, and bend 10 to the track 9', along which the cars are discharged, to thence pass back along the endless convoluted track to be charged again below, and so on until the pile of coal has been sufficiently turned over to free it from danger of spontaneous combustion.

It will now be seen that by means of a single endless track, permitting the use of a single operating-cable, I am able to provide for various different modes of loading, unloading, and transferring with very limited attendance.

I wish it to be understood that in this specification I use the expression "cars" in a sufficiently general sense to include any suitable conveying car or bucket adapted to discharge as well as to receive and convey a load of material.

I claim as my invention—

1. A plant for handling coal or other granular material, said plant comprising a storage structure with an endless convoluted track for cars, said track consisting of a loop at the upper part of the structure and a loop at the lower part of the structure underneath the upper loop, and two inclined tracks connecting the upper and lower loops, substantially as described.

2. A plant for handling coal or other granular material, said plant comprising a storage structure with a floor inclined from center to sides and discharge-gates at the sides at the bottom of the inclines in combination with an endless convoluted track for cars, said track consisting of an upper loop, one leg of which is over the storage part, while the other is at a point suitable for loading and discharging the cars, a lower loop under the gates, and two inclined tracks connecting the upper and lower loops, substantially as described.

3. A plant for handling coal or other granular material, said plant comprising a storage structure with a floor inclined from center to sides and discharge-gates at the sides at the bottom of the inclines in combination with an endless convoluted track for cars, said track consisting of upper and lower loops and inclined connecting-tracks.

4. A plant for handling coal and other granular material said plant comprising a storage structure, in combination with an endless convoluted track for cars, said track having one loop above and one below the storage part of the structure, with inclined connecting-tracks, one leg of the upper loop being along the line for discharge of the material into storage, and the other leg of the upper loop being along a line adapted for receiving and discharging the material, while the lower loop is along lines for the cars thereon to receive the material from storage.

5. A plant for handling coal or other granular material, said plant comprising a storage structure in combination with an endless convoluted track for cars, said track having one loop below and one loop above the storage part of the structure, one leg of the upper loop being along a line for discharge of the material into storage, while the lower loop is along lines for the cars thereon to receive the material from storage and also from outside sources, and two inclined tracks connecting said upper and lower loops.

In testimony whereof I have signed my name to this specification in the presence of two subscribing witnesses.

AUGUSTUS SMITH.

Witnesses:
HUBERT HOWSON,
F. WARREN WRIGHT.